(12) United States Patent
Tung et al.

(10) Patent No.: US 10,259,916 B2
(45) Date of Patent: Apr. 16, 2019

(54) LATEX FORMULATION FOR MAKING ELASTOMERIC PRODUCTS

(71) Applicant: TOP GLOVE SDN. BHD., Klang, Selangor (MY)

(72) Inventors: Cian Ying Tung, Klang (MY); Keuw Wei Lim, Klang (MY); Chong Ban Wong, Klang (MY)

(73) Assignee: TOP GLOVE SDN. BHD., Klang, Selangor (MY)

( * ) Notice: Subject to any disclaimer, the term of this patent is extended or adjusted under 35 U.S.C. 154(b) by 0 days.

(21) Appl. No.: 15/319,776

(22) PCT Filed: Sep. 29, 2015

(86) PCT No.: PCT/MY2015/050110
§ 371 (c)(1),
(2) Date: Dec. 17, 2016

(87) PCT Pub. No.: WO2016/072835
PCT Pub. Date: May 12, 2016

(65) Prior Publication Data
US 2017/0137584 A1    May 18, 2017

(30) Foreign Application Priority Data

Nov. 6, 2014   (MY) .............................. PI2014003115

(51) Int. Cl.
| | | |
|---|---|---|
| *C08J 5/02* | (2006.01) |
| *C08J 3/26* | (2006.01) |
| *C08K 3/22* | (2006.01) |
| *C08K 3/28* | (2006.01) |
| *C08K 5/06* | (2006.01) |
| *C08L 21/02* | (2006.01) |
| *C08K 3/10* | (2018.01) |
| *C08L 71/02* | (2006.01) |

(52) U.S. Cl.
CPC ...... *C08J 5/02* (2013.01); *C08K 3/10* (2013.01); *C08K 3/22* (2013.01); *C08K 3/28* (2013.01); *C08K 5/06* (2013.01); *C08L 21/02* (2013.01); *C08L 71/02* (2013.01); *C08J 3/26* (2013.01); *C08J 2313/02* (2013.01); *C08J 2321/02* (2013.01); *C08K 2003/2227* (2013.01)

(58) Field of Classification Search
CPC ......... C08J 3/24; C08J 3/26; C08J 5/02; C08J 2311/02; C08J 2309/04; C08J 2309/08; C08J 2309/10; C08J 2313/02; C08J 2319/02; C08J 2321/02; C08J 2307/02; C08C 1/00; C08L 7/02; C08L 9/04; C08L 9/08; C08L 9/10; C08L 11/02; C08L 13/02; C08L 19/02; C08L 21/02; C08K 3/22; C08K 5/06; C08K 2003/2227
See application file for complete search history.

(56) References Cited

U.S. PATENT DOCUMENTS

| | | | |
|---|---|---|---|
| 2003/0017286 A1 | 1/2003 | Williams et al. | |
| 2008/0227913 A1* | 9/2008 | Koide ............... | C08K 3/22 525/54.3 |
| 2012/0246799 A1 | 10/2012 | Khoo et al. | |

OTHER PUBLICATIONS https://web.archive.org/web/20131030011304/https://en.wikipedia.org/wiki/Polyethylene_glycol; Wikipedia "Polyethylene Glycol," Oct. 2013.*

* cited by examiner

*Primary Examiner* — Roberto Rabago
(74) *Attorney, Agent, or Firm* — Workman Nydegger

(57) ABSTRACT

A latex formulation for making elastomeric product, more particularly an elastomeric glove comprising a mixture of at least one base polymer, a cross-linker; and a pH adjuster, where the pH adjustor providing a pH range of 9.5 to 10.5. Still further, the present invention discloses a method for preparing a latex formulation for making elastomeric product, more particularly an elastomeric glove without using accelerators, zinc oxide and sulphur, which comprises the steps of mixing a base polymer with a pH adjuster, stirring the mixture for time period ranging from 20 minutes to 30 minutes, adding a cross-linker to the mixture, stirring said mixture for an hour, optionally adding at least one or more additive to said mixture, adding water to said mixture to achieve a total solid content (TSC) ranging in between 13% to 30% by w/w, allowing said mixture to mature.

10 Claims, No Drawings

LATEX FORMULATION FOR MAKING ELASTOMERIC PRODUCTS

FIELD OF INVENTION

The present invention relates to a formulation and method for preparing an accelerator-free elastomeric product, in particular elastomeric glove with enhanced mechanical properties without using zinc oxide, accelerators and sulphur.

BACKGROUND OF THE INVENTION

Natural rubber is made up from multiple units of isoprene, which is a monomer unit of natural rubber. Natural Rubber has a numbers of desirable properties such as elasticity, toughness, impermeability, adhesiveness, and electrical resistance that make it highly valuable asset in number of industries, especially in the chemical industry, as in the manufacture of adhesives, coatings, fibers, mouldings, insulators, gloves and many more.

Meanwhile, synthetic rubber is regarded as a better replacement in place of natural rubber, as it has a better aging period, better resistance towards chemicals, oil, wider range temperature and weathering properties. The prior art process for glove production utilizes conventional sulphur vulcanization system that uses accelerators, such as thiurams, thiazoles and carbamates, sulphur and/or common oxides, such as zinc oxide.

Further, the presence of accelerators, zinc oxide and sulphur was necessary in and the manufacture of rubber products, as the accelerators, zinc oxide and sulphur act as a crosslinking agent. However, it is to be noted that the protein from natural rubber induces type I immediate hypersensitivity (allergy). Meanwhile, type IV delayed hypersensitivity (allergy) is caused by the use of accelerators such as thiurams, thiazoles and carbamates in both natural rubber and synthetic rubber.

In order to overcome both the type I allergy and type IV hypersensitivity of contact dermatitis allergy, accelerator-free synthetic rubber gloves are needed.

U.S. patent No. 20120246799 A1 discloses an elastomeric rubber thin film without using vulcanizing accelerators and sulphur. The elastomeric rubber thin film comprises:
  a) a carboxylated nitrile latex;
  b) a divalent oxide;
  c) a pH adjuster to obtain a pH of 9 to 10; and
while controlling concentration of the total solid content (TSC) in the elastomeric rubber thin film to a range in between 18% to 30% by w/w, while water is used for the TSC variation.

Further, it is to be noted that the elastomeric rubber thin film in prior art however uses zinc oxide in its composition, which is a common oxide that has a lower ionic strength. This result in weaker crosslinking formation that directly affects the properties of product formed. Still further, although the elastomeric rubber thin film prepared via the above mentioned formulation is able to overcome the type I and type IV allergies, but the mechanical properties are only comparable to elastomeric rubber films produced using conventional sulphur vulcanization system, with no improvement in terms of mechanical properties.

As such, there is a need to produce a glove using an effective latex formulation and method that will enhance the mechanical properties as well as prevent type I immediate hypersensitivity (allergy) and type IV delayed hypersensitivity (allergy).

SUMMARY OF INVENTION

A latex formulation for making elastomeric product comprising a mixture of at least one base polymer and a cross-linker together with a pH adjuster to provide a pH range of 9.5 to 10.5, characterized in that the cross-linker is an admixture of a) trivalent metal or trivalent metal-based compound, wherein the trivalent metal-based compound is selected from a group consisting of aluminium, iron and chromium based compound, b) polyethylene glycol or derivatives of polyethylene glycol, wherein the polyethylene glycol or derivatives of polyethylene glycol have molecular weight ranging in between 200 Da to 200 000 Da and c) hydroxide salt, wherein the hydroxide salt is selected from the group consisting of potassium hydroxide, sodium hydroxide, ammonium hydroxide or mixtures thereof.

Further, a method for preparing a latex formulation for making elastomeric product comprises the steps of i) mixing a base polymer with a pH adjuster, the mixture having 0.15 phr to 0.50 phr of the pH adjuster for per hundred gram of the base polymer, ii) stirring the mixture obtained from step (i) for a time period ranging from 20 minutes to 30 minutes, iii) adding a cross-linker to the mixture obtained from step (ii), wherein the resultant mixture having 1.5% to 6.0% of the cross-linker for per hundred gram of the base polymer, iv) stirring the mixture obtained from step (iii) for an hour, v) adding water to the mixture obtained from step (iv) to achieve a total solid content ranging between 13% to 30% by w/w and vi) allowing the mixture obtained from step (v) for maturation for 20 hours to 30 hours, wherein the pH range of the mixture after step (vi) is maintained between 9.5 to 10.5 and wherein the cross-linker is an admixture of a) trivalent metal or trivalent metal-based compound, b) polyethylene glycol or derivatives of polyethylene glycol, wherein the polyethylene glycol or derivatives of polyethylene glycol have molecular weight ranging in between 200 Da to 200 000 Da and c) hydroxide salt, wherein the hydroxide salt is selected from the group consisting of potassium hydroxide, sodium hydroxide, ammonium hydroxide or mixtures thereof.

DETAILED DESCRIPTION OF THE PREFERRED EMBODIMENTS

The present invention relates to a latex formulation and a method for preparing the latex formulation for making elastomeric product, more particularly elastomeric glove. The glove produced using the present invention can overcome both Type I (immediate hypersensitivity) allergy and Type IV (delayed hypersensitivity) allergy, as well as enhancing mechanical properties of the gloves.

Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

A latex formulation for making elastomeric product comprising a mixture of:
  a) at least one base polymer; and
  b) a cross-linker;

with a pH adjuster. The elastomeric product is an elastomeric glove. The latex formulation of the present invention is produced without using sulphur, without using common oxides (for instance zinc oxide) and without using accelerators. The commonly used accelerators in the glove industries are thiurams, thiazoles and carbamates. The latex formulation of the present invention uses cross-linker which composition is an admixture of a trivalent metal or trivalent metal-based compound, polyethylene glycol or derivatives of polyethylene glycol, hydroxide salt, and water.

The base polymer used in said latex formulation is synthetic latex. The synthetic latex can be selected from the group consisting of polyisoprene, carboxylated polyacrylonitrile butadiene, neoprene or mixtures thereof. The preferred base polymer in the present invention is the base polymer with carboxylated group, such as carboxylated polyacrylonitrile butadiene.

Meanwhile, use of the pH adjuster in said latex formulation is to retain said latex formulation in a stable condition, which is by providing a suitable pH range. The preferred pH range that will keep said latex formulation in a stable condition is between 9.5 to 10.5. The pH adjuster is selected from the group consisting of potassium hydroxide, sodium hydroxide, ammonia or mixtures thereof, preferably ammonia.

The cross-linker formulation as mentioned above is an admixture of a trivalent metal or trivalent metal-based compound, polyethylene glycol or derivatives of polyethylene glycol, hydroxide salt and water, wherein the trivalent metal is at least one metal from aluminium, iron or chromium. Meanwhile, the trivalent metal-based compound is selected from a group consisting of aluminium, iron (III) and chromium (III) based compound, preferably aluminium based compound. The aluminium based compound is at least one compound from aluminium oxide, aluminium sulphate, aluminium chloride, aluminium hydroxide, aluminium phosphate, sodium aluminate or mixtures thereof. The trivalent metal or trivalent metal based-compound used for the cross-linker formulation is aluminium hydroxide.

Use of the trivalent metal or trivalent metal based compound in the cross-linker formulation eliminates the need of sulphur, accelerators and common metal oxides (for instance zinc oxide).

Another important feature of the cross-linker formulation is the use of polyethylene glycol or derivatives of polyethylene glycol, which functions as a chain extender. The polyethylene glycol or derivatives of polyethylene glycol forms a complex compound with trivalent metal or trivalent metal-based compound. The complex compound is a result of reaction between trivalent metal or trivalent metal-based compound and polyethylene glycol or derivatives of polyethylene glycol. The optimal cross-linkages between the complex and the latex polymer chain enhance the mechanical properties of the latex formulation. As a result of the cross-linkages, a glove with enhanced strength is produced, as depicted by table 2 to table 8.

Polyethylene glycol or derivatives of polyethylene glycol having molecular weight ranging in between 200 Da to 200 000 Da is used as chain extender, where the polyethylene glycol derivatives is either 2,4,7,9-tetramethyl-5-decyne-4,7-diol or ethoxylated 2,4,7,9-tetramethyl-5-decyne-4,7-diol or mixtures thereof. The hydroxide salt used in the cross-linker formulation is at least one salt selected from the group consisting from potassium hydroxide, sodium hydroxide, ammonium hydroxide or mixtures thereof. The preferred hydroxide salt used in the cross-linker formulation is sodium hydroxide.

Second aspect of the present invention relates to a method for preparing said cross-linker formulation, which method comprises the steps of:
  i. dissolving at least one trivalent metal or trivalent metal-based compound in an aqueous hydroxide salt;
  ii. stirring the mixture obtained from step (i) at a temperature ranging in between 40° C. to 80° C.; and
  iii. adding polyethylene glycol or derivatives of polyethylene glycol in the solution obtained from step (ii) to produce the cross-linker.

The cross-linker contains 1% to 20%, preferably 3% by weight of trivalent metal or trivalent metal-based compound. The cross-linker contains 1% to 10% by weight of hydroxide salt. The cross-linker contains 10% to 30%, preferably 20% by weight of polyethylene glycol or derivatives of polyethylene glycol. The remaining of cross-linker contains water.

Optionally, additives can also be added to the latex formulation, where the additive is at least one or more additive(s) selected from the group consisting of antifoams, waxes, surfactants, antioxidants, stabilizers, fillers, pigments or mixtures thereof. The prepared cross-linker is then dissolved in a 40% to 60% concentration of aqueous hydroxide salt before adding to a mixture comprising base polymer and pH adjuster for preparing the abovementioned latex formulation.

A method for preparing the latex formulation for making elastomeric product without using accelerators and without using sulphur comprises the steps of:
  i. mixing a base polymer with a pH adjuster, wherein the mixture having 0.15 phr to 0.50 phr of the pH adjuster for per hundred gram of the base polymer;
  ii. stirring the mixture obtained from step (i) for a time period ranging from 20 minutes to 30 minutes;
  iii. adding a cross-linker prepared as discussed above to the mixture obtained from step (ii), wherein the mixture having 1.5% to 6.0% of the cross-linker for per hundred gram of the base polymer;
  iv. stirring the mixture obtained from step (iii) for an hour;
  v. adding water to the mixture obtained from step (iv) to achieve a total solid content ranging in between 13% to 30% by w/w; and
  vi. allowing the mixture obtained in step (v) for maturation for 20 hours to 30 hours,
wherein the pH range of the mixture after step (vi) is maintained between 9.5 to 10.5, wherein the cross-linker is an admixture of a trivalent metal or trivalent metal-based compound, polyethylene glycol or derivatives of polyethylene glycol, hydroxide salt and water.

Further, the method for preparing a latex formulation preferably includes a step of adding at least one or more additive(s) selected from the group consisting of antifoams, waxes, surfactants, antioxidants, stabilizers, fillers, pigments or mixtures thereof to the mixture obtained from step (iv).

Further, the elastomeric product prepared is an elastomeric glove. The method of manufacturing elastomeric glove using said latex formulation prepared as disclosed above adopting a method commonly known in the glove manufacturing industry. The elastomeric glove prepared having a thickness ranging between 0.04 mm to 0.12 mm, a tensile strength ranging between 25 MPa to 40 MPa, a 500% modulus of 7 MPa to 12 MPa and an elongation at break ranging between 600% to 750%.

Apart from that, the elastomeric product using the above mentioned latex formulation can also be extended for preparing condoms, balloons and any other dipped latex product.

The following examples are constructed to illustrate the present invention in a non-limiting sense.

Example 1

Preparation of Cross-Linker
i. dissolving 3% by w/w of aluminium hydroxide in aqueous sodium hydroxide solution;
ii. stirring the mixture of aluminium hydroxide and aqueous sodium hydroxide obtained in step (i) at a temperature ranging in between 40° C. to 80° C.; and
iii. adding 20% by w/w of polyethylene glycol in the solution obtained from step (ii) to produce the cross-linker, wherein the prepared cross-linker is then dissolved in a 40% to 60% concentration of aqueous hydroxide salt before using it in the preparation of latex formulation.

Example 2

Preparation of the Latex Formulation
i. mixing carboxylated polyacrylonitrile butadiene with ammonia, wherein the mixture having 0.30 phr of the ammonia for per hundred gram of the base polymer;
ii. stirring the mixture obtained from step (i) for a time period ranging from 20 minutes to 30 minutes;
iii. adding 6.0% of the cross-linker for per hundred gram of the base polymer obtained from example 1 into the mixture obtained in step (ii);
iv. stirring the mixture obtained from step (iii) for about an hour;
v. adding water to the mixture obtained from step (iv) to achieve a total solid content between 13% to 30% by w/w; and
vi. allowing the resulting mixture obtained from step (v) for maturation for 20 hours to 30 hours for the formation of carboxylated polyacrylonitrile butadiene (NBR) latex formulation, wherein the pH range of the mixture after step (vi) is maintained between 9.5 to 10.5,
wherein the cross-linker is an admixture of an aluminium hydroxide, polyethylene glycol and aqueous sodium hydroxide, and
optionally, adding antifoam, wax, surfactant, antioxidant and pigment to the mixture obtained from step (iv).

Table 1 shows the chemical components used in this example to produce said latex formulation.

TABLE 1

Chemical components used to produce said latex formulation

| Chemicals | Parts per hundred rubber (phr) |
| --- | --- |
| Carboxylated polyacrylonitrile butadiene latex | 100.0 |
| Ammonia | 0.3 |
| Cross-linker | 2.0 |

Example 3

Manufacturing carboxylated polyacrylonitrile butadiene (NBR) glove using said latex formulation as prepared in example 2 adopting method commonly known in the glove manufacturing industry.

Mechanical properties (i.e. tensile strength, modulus at 300%, modulus at 500% and elongation at break) of the prepared NBR glove are tested according to standard method ASTM D6319. Table 2 shows the mechanical properties of the NBR glove prepared using different type of aluminium-based compound.

TABLE 2

Mechanical properties of the NBR glove using different type of Aluminium-based compound

| Type of Aluminium Salt | Tensile Strength (MPa) | Elongation at Break (%) | Modulus at 500% (MPa) |
| --- | --- | --- | --- |
| Aluminium Hydroxide | 31.0-46.0 | 581.0-654.0 | 14.0-22.0 |
| Aluminium Chloride | 33.0-42.0 | 511.0-573.0 | 23.0-33.0 |
| Aluminium Sulphate | 16.0-27.0 | 592.0-648.0 | 10.0-13.0 |
| Sodium Aluminate | 28.0-35.0 | 578.0-608.0 | 17.0-21.0 |
| Control | 28.0-33.0 | 625.0-661.0 | 11.0-15.0 |

The other mechanical property (i.e. force at break) of the prepared NBR glove is also tested according to standard method EN455. The mechanical property (force at break) of the NBR glove prepared using different type of aluminium-based compound is shown in Table 3.

TABLE 3

Force at break of the NBR glove using different type of Aluminium-based compound

| Type of Aluminium Salt | Force at Break (N) |
| --- | --- |
| Aluminium Hydroxide | 6.1-8.0 |
| Aluminium Chloride | 6.5-7.6 |
| Aluminium Sulphate | 4.0-5.5 |
| Sodium Aluminate | 5.4-6.7 |
| Control | 4.7-6.1 |

Further, Table 4 to Table 7 show mechanical properties (i.e. tensile strength, modulus at 300%, modulus at 500%, elongation at break and force at break) of the NBR glove using different type of trivalent metals.

TABLE 4

Tensile strength of the NBR glove using different type of trivalent metals

| Set | Control | Chromium (III) | Iron (III) | Aluminium |
| --- | --- | --- | --- | --- |
| Before Aging Tensile (MPa) | 27.0-35.0 | 10.0-14.0 | 11.0-16.0 | 37.0-45.0 |
| After Aging Tensile (MPa) | 31.0-46.0 | 11.0-22.0 | 10.0-16.0 | 32.0-40.0 |

TABLE 5

Elongation of the NBR glove using different type of trivalent metals

| Set | Control | Chromium (III) | Iron (III) | Aluminium |
| --- | --- | --- | --- | --- |
| Before Aging Elongation (%) | 575.0-613.0 | 741.0-795.0 | 737.0-786.0 | 617.0-654.0 |
| After Aging Elongation (%) | 502.0-535.0 | 699.0-787.0 | 736.0-804.0 | 589.0-628.0 |

TABLE 6

Modulus at 500% of the NBR glove using different type of trivalent metals

| Set | Control | Chromium (III) | Iron (III) | Aluminium |
|---|---|---|---|---|
| Before Aging Modulus at 500% (MPa) | 13.0-18.0 | 2.3-2.7 | 2.5-2.9 | 14.0-22.0 |
| After Aging Modulus at 500% (MPa) | 30.0-38.0 | 2.8-3.2 | 2.6-3.1 | 15.0-21.0 |

TABLE 7

Force at break of the NBR glove using different type of trivalent metals

| Set | Control | Chromium (III) | Iron (III) | Aluminium |
|---|---|---|---|---|
| Before Aging Force at Break (N) | 5.9-7.0 | 3.1-4.2 | 3.1-3.9 | 6.1-8.0 |
| After Aging Force at Break (N) | 7.2-9.4 | 4.1-5.1 | 2.5-4.9 | 6.2-8.9 |

In addition, Table 8 shows the comparison of physical and mechanical properties of the NBR glove prepared using the present invention and glove prepared using prior art accelerator-free vulcanization system.

TABLE 8

Physical and mechanical properties of the NBR glove of the present invention and the prior art

| Set | Prior Art | Prior Art | Present Invention | Present Invention |
|---|---|---|---|---|
| Thickness (mm) | 0.08-0.09 | 0.07-0.08 | 0.06-0.07 | 0.07-0.08 |
| Tensile Strength (MPa) | 20-31 | 20-22 | 31-41 | 26-34 |
| Elongation at Break (%) | 585-620 | 580-620 | 574-623 | 611-666 |
| Modulus at 300% (MPa) | Not Stated | Not Stated | 4.5-6.4 | 5.3-6.0 |
| Modulus at 500% (MPa) | 9.1-10 | 6.0-6.5 | 14.4-21.3 | 13.7-16.8 |

The mechanical properties like tensile strength and elongation at break of the glove prepared using the present invention results in an enhanced value than the gloves prepared using other accelerator-free vulcanization system.

As a whole, the glove prepared using the present invention gives a better and/or enhanced mechanical properties as compared to glove prepared using other accelerator-free system. Further, the glove prepared based on the present invention is free from type I immediate hypersensitivity (allergy) and type IV delayed hypersensitivity (allergy).

The invention claimed is:

1. A method for preparing a latex formulation for making elastomeric product comprises the steps of:
   i. mixing a base polymer with a pH adjuster to form a mixture, wherein the mixture having 0.15 phr to 0.50 phr of the pH adjuster for per hundred gram of the base polymer;
   ii. stirring the mixture obtained from step (i) for a time period ranging from 20 minutes to 30 minutes;
   iii. adding a cross-linker to the mixture obtained from step (ii), wherein the resultant mixture having 1.5% to 6.0% of the cross-linker for per hundred gram of the base polymer;
   iv. stirring the mixture obtained from step (iii);
   v. adding water to the mixture obtained from step (iv) to achieve a total solid content ranging between 13% to 30% by w/w; and
   vi. allowing the mixture obtained from step (v) for maturation for 20 hours to 30 hours,
   wherein the pH range of the mixture after step (vi) is maintained between 9.5 to 10.5, wherein the cross-linker is an admixture of:
      a) trivalent metal or trivalent metal-based compound;
      b) polyethylene glycol having a molecular weight ranging in between 200 Da to 200,000 Da; and
      c) hydroxide salt, wherein the hydroxide salt is selected from the group consisting of potassium hydroxide, sodium hydroxide, ammonium hydroxide or mixtures thereof.

2. The method for preparing a latex formulation as claimed in claim 1 wherein the elastomeric product is an elastomeric glove.

3. The method for preparing a latex formulation as claimed in claim 1 wherein the trivalent metal is one metal from aluminium, iron, or chromium.

4. The method for preparing a latex formulation as claimed in claim 1 wherein the trivalent metal-based compound is selected from a group consisting of aluminium, iron (III) or chromium (III) based compound.

5. The method for preparing a latex formulation as claimed in claim 1 wherein the cross-linker contains 1% to 20% by weight of the trivalent metal or trivalent metal-based compound.

6. The method for preparing a latex formulation as claimed in claim 1 wherein the cross-linker contains 3% by weight of trivalent metal or trivalent metal-based compound.

7. The method for preparing a latex formulation as claimed in claim 1 wherein the cross-linker contains 1% to 10% by weight of hydroxide salt.

8. The method for preparing a latex formulation as claimed in claim 1 wherein the cross-linker contains 10% to 30% by weight of polyethylene glycol.

9. The method for preparing a latex formulation as claimed in claim 1 wherein the cross-linker contains 20% by weight of polyethylene glycol.

10. The method for preparing a latex formulation as claimed in claim 1 further includes a step of adding at least one or more additive selected from the group consisting of antifoams, waxes, surfactants, antioxidants, stabilizers, fillers, pigments or mixtures thereof to the mixture obtained from step (iv).

* * * * *